J. N. STOUT.
CORN PLANTER.
APPLICATION FILED MAR. 11, 1910.

967,851.

Patented Aug. 16, 1910.
3 SHEETS—SHEET 1.

Witnesses
Edwin G. McKee
Wm. Bagger

Inventor
J. N. Stout
By Victor J. Evans
Attorney

THE NORRIS PETERS CO., WASHINGTON, D. C.

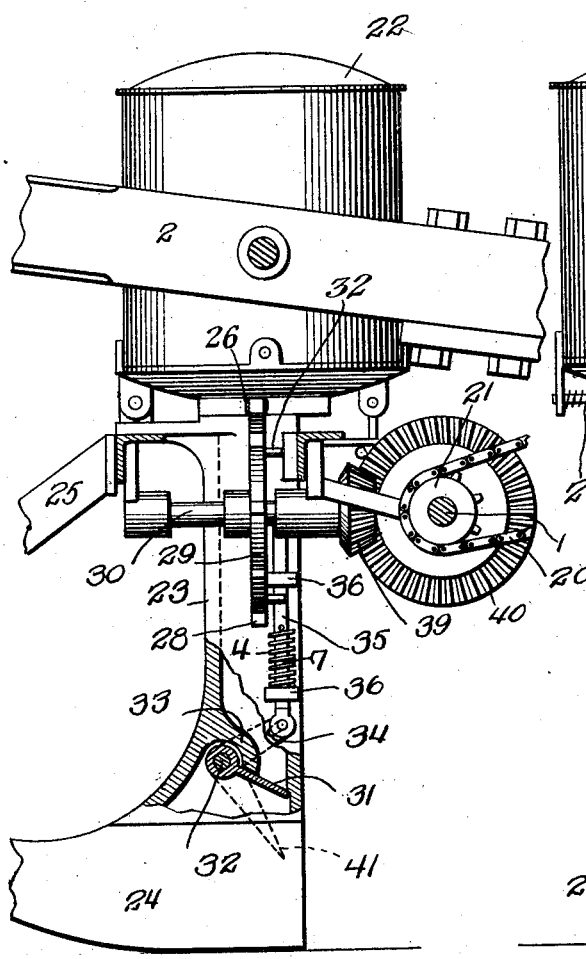
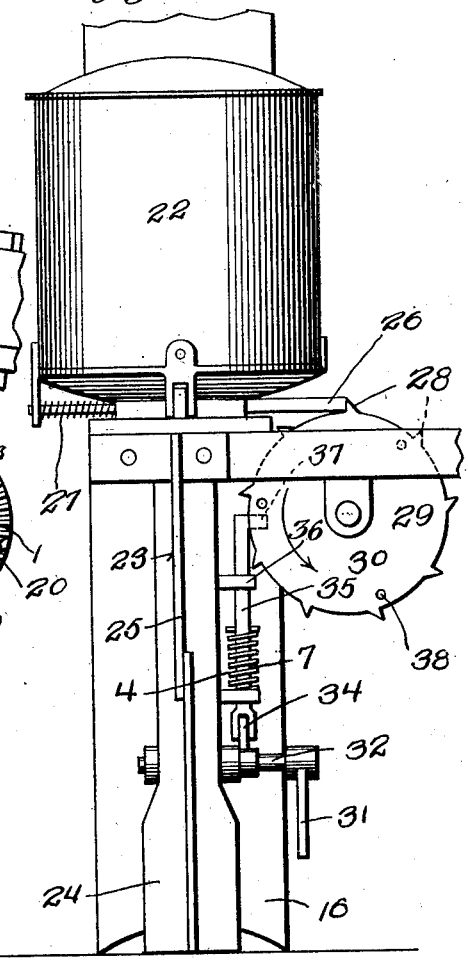

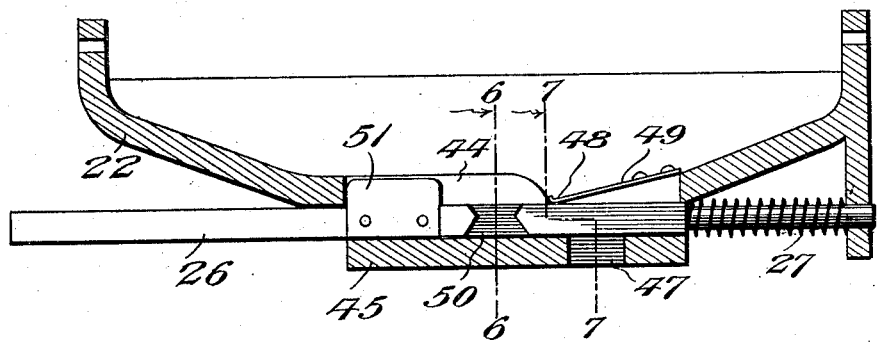
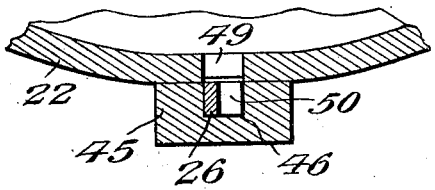
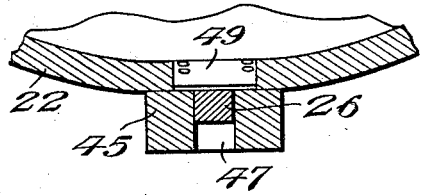
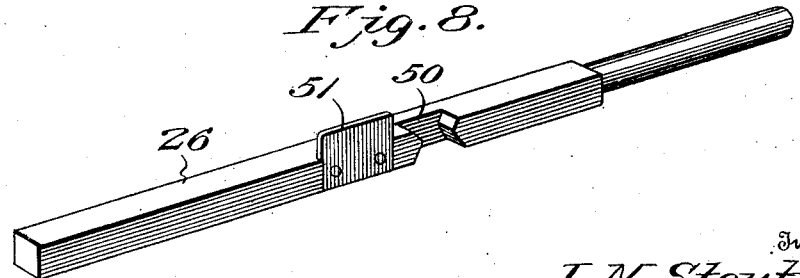

UNITED STATES PATENT OFFICE.

JOHN N. STOUT, OF LEWIS, INDIANA.

CORN-PLANTER.

967,851.  Specification of Letters Patent.  Patented Aug. 16, 1910.

Application filed March 11, 1910. Serial No. 548,569.

*To all whom it may concern:*

Be it known that I, JOHN N. STOUT, a citizen of the United States of America, residing at Lewis, in the county of Vigo and State of Indiana, have invented new and useful Improvements in Corn-Planters, of which the following is a specification.

This invention relates to corn planters of that class which are arranged for depositing seed in hills at predetermined distances apart, and the prime object of the invention is to construct a machine of this class in which a charge of an exact predetermined number of seeds will be deposited in the ground at each operation of the dropping mechanism.

A further object of the invention is to provide simple and efficient means for delivering seeds singly from the seed box or hopper to a chamber or compartment in the seed tube which is obstructed by a dropping valve and for actuating the latter valve at predetermined intervals when the desired number of seeds to constitute a charge have been accumulated.

Further objects of the invention are to simplify and improve the general construction and operation of a corn-planting machine of the character outlined above.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the invention may be resorted to when desired.

Figure 1:
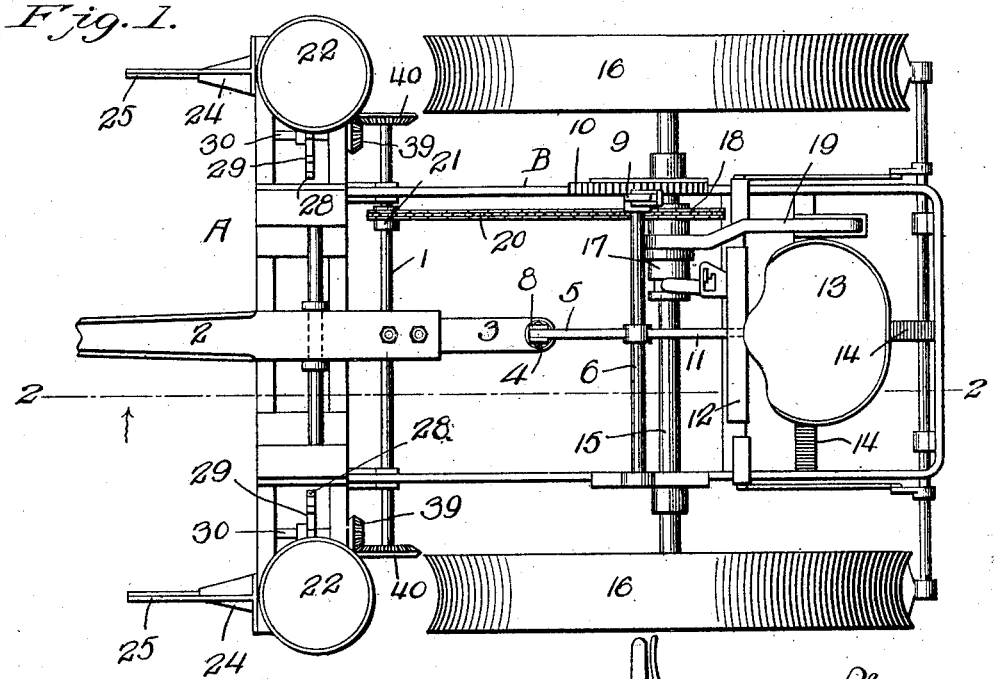
Figure 2:
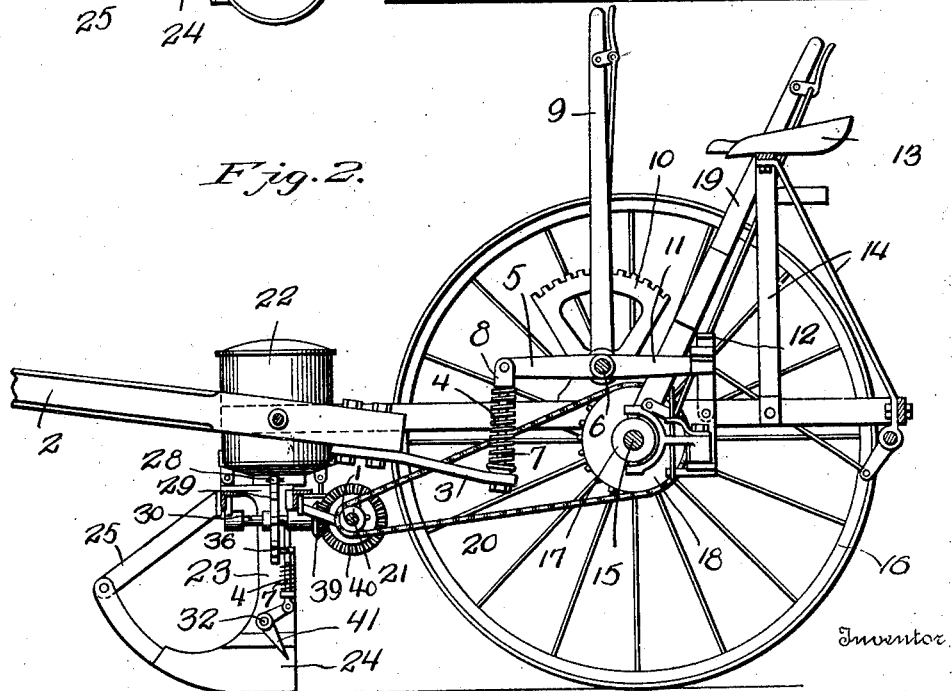

In the drawings,—Figure 1 is a top plan view of a corn planter constructed in accordance with the invention. Fig. 2 is a side elevation of the same. Fig. 3 is a side elevation, enlarged, partly in section of one of the seed boxes with the seed tube, shoe and related parts. Fig. 4 is a front elevation of the same. Fig. 5 is a sectional detail view taken transversely through the lower portion of one of the seed boxes or hoppers. Fig. 6 is a sectional detail view taken on the line 6—6 in Fig. 5. Fig. 7 is a sectional detail view taken on the line 7—7 in Fig. 5. Fig. 8 is a perspective detail view of one of the seed slides detached.

Corresponding parts in the several figures are denoted by like characters of reference.

The front frame or draft frame A is hingedly connected in the usual manner with the main frame B by means including a shaft 1 which is supported for rotation in bearings which constitute the hinge connection between the frames. The draft frame supports the tongue 2 which is provided with a rearwardly extending arm 3, the latter being connected by a link 4 with an arm 5 extending forwardly from a rock shaft 6 which is supported for oscillation in the main frame. A spring 7, which is coiled upon the link 4, is interposed between the head 8 of said link at one end and the extension arm 3 at the other end, said spring being compressible by upward movement of the arm 3 upon the link, thus serving to resiliently support the tongue to assist in carrying the weight of the latter. The rock shaft 6 is equipped with a hand lever 9 by means of which it may be oscillated to elevate the rear end of the tongue, thus lifting the draft frame, as is well understood in this class of machines for the purpose of raising the earth-engaging devices carried by the draft frame to a non-operative position. The hand lever 9 is provided with a suitably operated stop member adapted to engage a segment rack 10 for the purpose of securely retaining the rock shaft and related parts at various adjustments. To further facilitate the operation of the rock shaft, the same is provided with a rearwardly extending arm 11 carrying a treadle 12 to be operated by the driver, whose seat 13 is mounted upon supports 14 suitably connected with the frame. The axle 15, which supports the main frame, is equipped with transporting and covering wheels 16, and said axle has a clutch device 17 for throwing into or out of gear a sprocket wheel 18, the hub of which is connected with a lever 19 which, by a suitable pawl and ratchet means, not shown, may be utilized to rotate the sprocket wheel 18 when the latter is disconnected from the axle. A chain or link belt 20 connects the sprocket wheel 18 with a sprocket wheel 21 upon the shaft 1 to which rotary motion may thus be transmitted from the axle, or by means of the lever 19, as stated. The object of this construction is simply to enable the operator to put the planter in check, that is to say, in proper alinement any time when it may for any reason happen to be out of check without stopping the planter, and likewise to put the planter in check before starting to plant at the beginning of each row.

The draft frame supports the seed boxes 22 which are arranged above the seed tubes 23 carrying at their lower ends the furrow opening shoes 24 which are strengthened and reinforced by braces 25 connecting the points of the shoes with the draft frame. Arranged for transverse sliding movement between the seed boxes and the seed tubes are the spring-actuated seed slides 26, each of which is forced by the action of a suitable spring 27 in an inward direction, so as to lie in the path of tappets 28 upon wheels 29 which are mounted upon shafts 30 that are supported in suitable bearings in the draft frame adjacent to the seed boxes, as will be plainly seen in Fig. 1. Each seed box is provided in its lower portion with a slot 44 adjacent to which is arranged a bottom member 45 having a groove 46 for the reception of the slide 26, said bottom member being also provided with an aperture 47 communicating with the upper end of the seed tube 23. The side walls of the slot 44 are provided with beveled notches 48 adjacent to which a flat spring 49 is suitably supported, said spring constituting a resilient tongue which rides upon the upper face of the seed slide 26. The latter is of a cross sectional area and contour corresponding with that of the groove 46 wherein it slides, and said slide is provided in one side thereof with a notch or recess 50, the side walls of which diverge upwardly and downwardly, and said recess being of suitable dimensions to accommodate a single grain of seed disposed edgewise. The slide 26 also carries an upwardly extending flange 51 formed preferably of a thin plate of sheet metal which is suitably secured upon the slide at a point intermediate the recess 50 and the outer end of the slide. The office of this flange, which, as will be observed, extends upwardly into the slot 44, is to engage the seeds lying within said slot and to tilt said seeds to an edgewise position which will enable them to drop singly into the recess 50, entrance into said recess being facilitated by the upward divergence of the end walls thereof.

It will be readily seen that when the seed slide is projected against the tension of the spring 27, there will be ample time for a seed to enter into the recess 50, superposed seeds being brushed off or removed by the spring tongue 49, as the recessed portion of the slide passes beneath the free end of said tongue. When the recess 50 reaches a position above the aperture 47 the seed will be discharged through the latter. The reciprocatory movement of the flange 51 within the slot 44 will tend to tilt the seeds contained within said slot upon edge so that when the slide is projected outwardly under the tension of the spring 27, a single seed will surely enter edgewise into the recess or pocket 50 for a repetition of the operation. The grains of seed delivered by the plates 26 will drop into the seed tubes 23, where they are intercepted by valves 31 supported upon rock shafts 32 that extend transversely through the seed tubes, where they are protected by overhanging flanges 33, (best seen in Fig. 3) which said overhanging flanges combine with the rear walls of the seed tubes and the valves 31 to form seed-receiving pockets. Each rock shaft 32 is provided with a trip arm 34 which is pivotally connected with the lower end of a spring-actuated slide 35 mounted in brackets or keepers 36 upon the seed tube, the upper end of said slide being provided with a lateral extension 37 lying in the path of pins 38, said pins extending from the faces of the tappet wheels or disks 29. The shafts 30 carrying the tappet wheels are provided adjacent to their rear ends with pinions 39 meshing with bevel gears 40 adjacent to the ends of the shaft 1 which is driven, as hereinbefore described, by the chain 20 from the axle of the machine.

In the accompanying drawing each tappet wheel is shown equipped with nine tappets 28 and with three pins 38. By the actuation of the seed slide by the tappets, one grain will be delivered into the seed tube at each operation, until three grains have accumulated, when the valve-actuating slide 35 will be operated by one of the pins 38, thus operating the valve to permit the charge of three grains to drop into the furrow which has been opened by the runner of the device. It is obvious that by varying the relative number and arrangement of tappets 28 and pins 38 charges consisting of any desired number of seeds may be delivered at suitable intervals. The valve-carrying rock shafts 32 are each provided with a marker 41 which, when the valve is actuated to deposit the charge of seed, will make an indentation in the ground to indicate the location of the hill.

From the foregoing description, taken in connection with the drawings hereto annexed, the operation and advantages of this invention will be readily understood by those skilled in the art to which it appertains. The construction is simple and efficient for the purposes for which it is provided.

Having thus described the invention, what is claimed as new, is:—

1. In a corn planter, a seed box, a seed tube and a furrow-opening device, a tappet wheel supported for rotation adjacent to the seed tube, said wheel having pins extending from one face thereof and a number of tappets which is a multiple of the number of pins, a spring-actuated seed slide supported for reciprocation between the seed box and the seed tube, said slide lying in the path of the tappet wheel and operated by the tappets thereof, a rock shaft supported for oscillation in the seed tube and having a valve and a radially extending arm, and a spring-actuated slide connected with said arm and extended in the path of the pins extending from the tappet wheel whereby said slide is actuated.

2. In a corn planter, a seed tube, a drop valve arranged for oscillation therein, a marker connected with said valve, a spring-actuated slide connected with the valve, a seed box supported above the seed tube, a spring-actuated slide arranged for reciprocation between the seed box and the seed tube, and means for actuating the seed slide and the valve-operating slide at predetermined intervals, the intervals between the operation of the valve-operating slide being of greater duration than those between the operation of the seed slide.

3. In a corn planter, a seed box having a slot, a grooved bottom member supported adjacent to the slot and having an aperture, a seed tube communicating therewith and a spring-actuated slide supported for reciprocation in the groove of the bottom member, said slide having a pocket in one side thereof, and a flange thereon extending upwardly into the slot of the seed box.

4. In a corn planter, a seed box having a slot, the side walls of which are provided with beveled notches, a spring tongue supported upon the upper edges of the notches, a grooved bottom member supported adjacent to the slot and having an aperture, a seed tube communicating with the latter, and a spring-actuated slide supported for reciprocation in the groove of the bottom member, said slide being provided with a pocket in one side thereof and with a flange thereon extending upwardly into the slot of the seed box.

5. In a corn planter, a seed box having a slot, a grooved bottom member supported adjacent to the slot and having an aperture, a seed tube extending below the bottom member, a spring-actuated slide supported for reciprocation in the groove of the bottom member, said slide having a pocket in one side thereof and a flange thereon extending upwardly into the slot in the seed box, and a suitably supported spring tongue engaging the upper face of the seed slide.

In testimony whereof I affix my signature in presence of two witnesses.

JOHN N. STOUT.

Witnesses:
M. E. JEAN,
ANNA MERCHANT.